(12) United States Patent
Verbeke et al.

(10) Patent No.: US 11,548,973 B2
(45) Date of Patent: Jan. 10, 2023

(54) ISOCYANATE TRIMERIZATION CATALYST FOR MAKING POLYISOCYANURATE COMPRISING FOAMS

(71) Applicant: Huntsman International LLC, The Woodlands, TX (US)

(72) Inventors: Hugo Verbeke, Wilsele (BE); Anja Anneke Vanhalle, Everberg (BE)

(73) Assignee: Huntsman International LLC, The Woodlands, TX (US)

( * ) Notice: Subject to any disclaimer, the term of this patent is extended or adjusted under 35 U.S.C. 154(b) by 28 days.

(21) Appl. No.: 15/301,411

(22) PCT Filed: Mar. 31, 2015

(86) PCT No.: PCT/EP2015/057079
§ 371 (c)(1),
(2) Date: Oct. 3, 2016

(87) PCT Pub. No.: WO2015/150408
PCT Pub. Date: Oct. 8, 2015

(65) Prior Publication Data
US 2017/0198082 A1   Jul. 13, 2017

(30) Foreign Application Priority Data

Apr. 3, 2014  (EP) .................................... 14163431

(51) Int. Cl.

| | |
|---|---|
| *C08G 18/38* | (2006.01) |
| *C08G 18/48* | (2006.01) |
| *C08G 18/18* | (2006.01) |
| *C08G 18/22* | (2006.01) |
| *C08G 18/09* | (2006.01) |
| *C08G 18/16* | (2006.01) |
| *C08G 18/76* | (2006.01) |
| *C08G 18/08* | (2006.01) |
| *C08G 18/61* | (2006.01) |
| *C08J 9/12* | (2006.01) |
| *C08K 5/521* | (2006.01) |
| *C09K 21/12* | (2006.01) |

(52) U.S. Cl.
CPC ....... *C08G 18/3853* (2013.01); *C08G 18/092* (2013.01); *C08G 18/14* (2013.01); *C08G 18/163* (2013.01); *C08G 18/1808* (2013.01); *C08G 18/1875* (2013.01); *C08G 18/225* (2013.01); *C08G 18/4829* (2013.01); *C08G 18/61* (2013.01); *C08G 18/7664* (2013.01);
*C08J 9/127* (2013.01); *C08K 5/521* (2013.01); *C09K 21/12* (2013.01); *C08G 2110/0025* (2021.01); *C08G 2110/0058* (2021.01); *C08G 2115/02* (2021.01); *C08G 2330/00* (2013.01); *C08J 2203/182* (2013.01); *C08J 2205/052* (2013.01); *C08J 2205/10* (2013.01); *C08J 2375/08* (2013.01)

(58) Field of Classification Search
CPC ............ C08G 18/3853; C08G 18/1875; C08G 18/1808; C08G 18/225; C08G 18/092; C08G 18/163; C08G 18/7664; C08G 18/14; C08G 18/61; C08G 18/4829; C08G 2210/0058; C08G 2115/02; C08G 2330/00; C08G 2110/0025; C08G 2101/0058; C08G 2101/0025; C08J 9/127; C08J 2203/182; C08J 2205/052; C08J 2205/10; C08J 2375/08; C08J 2101/0025; C08K 5/521; C09K 21/12
See application file for complete search history.

(56) References Cited

U.S. PATENT DOCUMENTS

| | | | |
|---|---|---|---|
| 4,256,841 A | 3/1981 | Horacek et al. | |
| 4,568,703 A | 2/1986 | Ashida | |
| 5,151,216 A * | 9/1992 | Liu .................... | C08G 18/5021 244/117 R |
| 2005/0245629 A1 | 11/2005 | Grigsby, Jr. et al. | |
| 2011/0124756 A1 | 5/2011 | Singh et al. | |
| 2011/0196055 A1* | 8/2011 | Kramer .............. | C08G 18/4018 521/93 |
| 2011/0201706 A1 | 8/2011 | Athey et al. | |
| 2011/0201707 A1 | 8/2011 | Athey et al. | |
| 2011/0201708 A1 | 8/2011 | Athey et al. | |
| 2011/0201709 A1 | 8/2011 | Athey et al. | |
| 2014/0186611 A1* | 7/2014 | Skowronski ....... | C08G 18/4829 428/304.4 |

FOREIGN PATENT DOCUMENTS

| | | |
|---|---|---|
| EP | 1004607 | 5/2000 |
| GB | 1498506 | 1/1978 |

* cited by examiner

*Primary Examiner* — Rabon A Sergent
(74) *Attorney, Agent, or Firm* — Huntsman International LLC

(57) ABSTRACT

A trimerization catalyst composition suitable for making a polyisocyanurate comprising (insulation) foam, said composition comprising at least a trimerization catalyst compound selected from one or more organic salts from alkoxides wherein said organic salt is selected from alkali metal, earth alkali metal, a transition metal such as Ti and/or quaternary ammonium organic salts.

11 Claims, 3 Drawing Sheets

ISOCYANATE TRIMERIZATION CATALYST FOR MAKING POLYISOCYANURATE COMPRISING FOAMS

CROSS-REFERENCE TO RELATED APPLICATIONS

This application is the National Phase of International Application PCT/EP2015/057079 filed Mar. 31, 2015 which designated the U.S., and which claims priority to European application Serial Number 14163431.1 filed Apr. 3, 2014. The noted applications are incorporated herein by reference.

FIELD OF INVENTION

The present invention is related to a catalyst compound for catalysing the trimerization of a polyisocyanate compound (trimerization catalyst) for making a polyisocyanurate comprising foam, in particular polyisocyanurate comprising rigid foams.

Further the present invention is related to a process for preparing said polyisocyanurate comprising (rigid) foam.

Still further the present invention is concerned with a polyisocyanurate comprising (rigid) foam suitable for use as insulation foams obtained by using the trimerization catalyst according to the invention.

BACKGROUND

US2011201709 discloses a trimerisation catalyst system comprising an imidazolium or imidazolinium cation, an isocyanate-trimer inducing anion wherein the trimerisation catalyst system has a trimerisation activation temperature in the range of equal to or less than 73° C.

US2011201707 discloses a trimerisation catalyst system comprising a phosphatrane cation and an isocyanate-trimer inducing anion wherein said trimerisation catalyst system has a trimerisation activation temperature in the range of equal to or less than 73° C. US2011201708 discloses a similar catalyst comprising a phosphonium cation.

US2005245629 discloses a catalyst for formation of a polyisocyanurate foam wherein the catalyst is comprising an amine component comprising N,N,N'-trimethylaminoethyl-ethanolamine and a trimer catalyst component selected from an alkali metal salt of a carboxylic acid.

EP1004607 discloses a method for making a rigid polyurethane/polyisocyanurate foam by reacting a polyisocyanate and a polyol in the presence of a catalyst composition comprising a trimerization catalyst compound of the formula $B^{+-}O_2—C—X—C(O)—NR—R^1$ where X is the residue of an organic acid anhydride; R is hydrogen or a C1-C4 alkyl group; $R^1$ is a C1-C4 alkyl or a phenyl group or $Y—NR^2R^3$, where Y is a C2-C6 alkylene group which may contain heteroatoms and $R^2$ and $R^3$ are C1-C20 alkyl groups which may contain oxygen atoms or which together with the tertiary nitrogen form a 5 or 6 member ring which may contain oxygen atoms; and B is an alkali metal ion or a quaternary ammonium ion.

Current technology for making polyisocyanurate comprising foams suitable for making rigid (insulation) foams have however several processing issues such as rolling defects and bad adhesion to metal surfaces.

Polyisocyanurate comprising foams are further continuously subjected to increased regulations with respect to flame retardants and reduced smoke generation. Flame retardance is typically improved because of the presence of isocyanurate rings. However, existing trimerisation catalyst systems for producing such isocyanurate rings tend to be active only at high temperatures, which is typical within the core zone of the foam during processing. Therefore, the existing trimerisation catalyst systems tend to facilitate the formation of isocyanurate rings mainly in the core zone of the foams. Although the use of existing trimerisation catalyst systems improves the flame retardant and smoke generation traits of the core zone of PIR foams, there is still a need to further improve such properties within the outer zones of such PIR foams.

GOAL OF THE INVENTION

It is the goal of the invention to improve the processing for making polyisocyanurate materials suitable for making rigid (insulation) foams by use of improved trimerization catalysts. The goal is to improve the polyisocyanurate conversion while keeping the closed cell content which is a must for the insulation properties (low lambda value). A higher polyisocyanurate conversion will lead to better adhesion of the foam to metal surfaces and better fire, smoke and toxicity properties.

Surprisingly we have found a trimerization catalyst which shows a low activation temperature (lower compared to classic above described state of the art organic metal salts of carboxylic acids such as NaLactate) in combination with a smooth rise profile and improved polyisocyanurate conversion. As a result of the lower activation temperature the trimerization of the isocyanurate rings is facilitated and increased in the outer zones of the foam and as a result facilitating the improvement of flame retardant in that zone.

The trimerization catalyst of the present invention gives a smooth rise profile or in other words a less pronounced second rise which allows easier processing on laminating machines and potentially also allows moulding PIR foams which is currently not possible using state of the art trimerization catalysts because of the flow restriction caused by the second rise.

The trimerization catalyst of the present invention gives an improved polyisocyanurate conversion, especially at the skin of the foam. The skin of the foam typically receives the least heat and therefore typically less conversion into polyisocyanurate is achieved there. Using the catalyst of the present invention leads to a higher polyisocyanurate conversion in general and in particular at the skin without loosing conversion in the core. A better polyisocyanurate conversion at the skin leads to better adhesion to metal surfaces thereby avoiding the additional use of a glue layer and better fire properties in the final end product (e.g. polyisocyanurate insulation panels).

Additionally the trimerization catalyst of the present invention further allows producing higher index foams leading to further improvement of the fire resistance of the foam.

Therefore, the present invention relates to trimerization catalysts selected from one or more organic salts from alkoxides, preferably said organic salt is selected from alkali metal, earth alkali metal, a transition metal such as Ti and/or quaternary ammonium organic salts from alkoxides such as potassium ethoxide, sodium ethoxide, potassium methoxide, sodium methoxide, potassium tert-butoxide, titanium isopropoxide and mixtures thereof suitable for making a polyisocyanurate comprising rigid foam.

Still further the present invention is concerned with a process to prepare a polyisocyanurate comprising rigid foam, said polyisocyanurate comprising rigid foam obtained using the trimerization catalyst of the invention and the use of said polyisocyanurate comprising rigid foam as/in insulation panels.

SUMMARY OF THE INVENTION

The present invention relates to a trimerization catalyst which is suitable for making a polyisocyanurate-polyurethane comprising rigid insulation foam (PIR-PUR) having a density <60 kg/m³ and a process for making said foam.

According to embodiments, the trimerization catalyst composition of the present invention comprises at least a trimerization catalyst compound selected from one or more organic alkoxides wherein said organic salt is selected from an alkali metal, an earth alkali metal, a transition metal such as Ti and/or a quaternary ammonium organic alkoxide.

According to embodiments, the trimerization catalyst composition of the present invention comprises at least a trimerization catalyst compound wherein the trimerization catalyst compound corresponds to the general formula (I):

$$(R\!-\!O^-)_x M^{+x} \quad\quad (I)$$

Wherein
  R is an organic group which is selected from an hydrocarbyl group which hydrocarbyl groups having 1-4 carbon atoms,
  x is a number being defined by the oxidation state of M
  M is selected from an alkali metal ion, an earth alkali metal ion, a transition metal ion such as Ti or a quaternary ammonium ion According to embodiments, mixtures of different trimerization catalyst compounds may be used in the process for making a polyisocyanurate-polyurethane comprising rigid insulation foam (PIR-PUR) having a density <60 kg/m³ according to the invention.

According to embodiments, the organic groups R in the trimerization catalyst compound according to formula I are identical. For example in case M is selected from $Ti^{+4}$, the organic groups may be identical and for example selected from isopropyl groups (see formula II). Titanium (IV) isopropoxide, also commonly referred to as titanium tetraisopropoxide or TTIP, is a chemical compound with the formula $Ti[OCH(CH_3)_2]_4$.

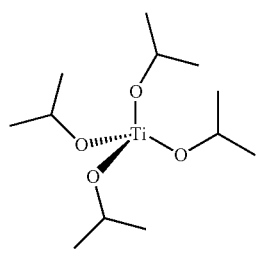

II

According to embodiments, the trimerization catalyst compound in the catalyst composition according to the invention may be selected from potassium ethoxide, sodium ethoxide, potassium methoxide, sodium methoxide, potassium tert-butoxide, titanium isopropoxide and mixtures thereof.

According to embodiments, the trimerization catalyst composition of the present invention comprises further a solvent.

According to embodiments, the trimerization catalyst composition of the present invention comprises further a monool/polyol composition.

According to embodiments, the trimerization catalyst composition of the present invention comprises further a monool/polyol composition wherein the polyol/monool composition is an isocyanate reactive agent which comprises polyester and/or polyether polyols having an average molecular weight of preferably 32-6000 and an average nominal functionality of preferably 1-8.

According to embodiments, the trimerization catalyst composition of the present invention comprises further one or more surfactants and/or one or more flame retardants and/or one or more antioxidants and/or one or more auxiliary blowing agents (not being water) and/or one or more urethane catalysts and/or one or more auxiliary trimerisation catalysts (other than the trimerisation catalyst compound according to the invention).

The present invention further relates to a process for making a polyisocyanurate-polyurethane comprising foam (PIR-PUR), said process comprising combining and mixing at an isocyanate index of at least more than 100, preferably 180 or higher, more preferably higher than 250:
  1) A polyisocyanate composition comprising one or more polyisocyanate compounds;
  2) a trimerization catalyst composition comprising at least a trimerization catalyst compound selected from one or more organic alkoxides corresponding to the formula (I):

$$(R\!-\!O^-)_x M^{+x} \quad\quad (I)$$

Wherein
  R is an organic group which is selected from an hydrocarbyl group which hydrocarbyl groups having 1-4 carbon atoms,
  x is a number being defined by the oxidation state of M
  M is selected from an alkali metal ion, an earth alkali metal ion, a transition metal ion such as Ti and/or a quaternary ammonium ion
  3) an isocyanate-reactive composition comprising one or more isocyanate reactive compounds;
  4) optionally one or more surfactants, one or more flame retardants, water, one or more antioxidants, one or more auxiliary blowing agents, one or more urethane catalysts, one or more auxiliary trimerisation catalysts, or combinations thereof;

According to embodiments, the trimerisation catalyst compound used in the process for making a PIR-PUR foam according to the invention is present in an amount such that the number of catalyst equivalents over the number of isocyanate equivalents ranges from 0.001 to 0.4, preferably in an amount from 0.01 to 0.26, or from 0.01 to 0.24, or from 0.02 to 0.2.

According to embodiments, the polyisocyanate compounds used in the process for making a PIR-PUR foam according to the invention are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds used in the process for making a PIR-PUR foam according to the invention are selected from monools and/or polyols such as glycols, high molecular weight polyether polyols and polyester polyols, mercaptans, carboxylic acids such as polybasic acids, amines, polyamines, components comprising at least one alcohol group and at least one amine group such as polyaminepolyols, urea and amides.

According to embodiments, the one or more isocyanate reactive compounds used in the process for making a PIR-PUR foam according to the invention is selected from monools or polyols which have an average nominal hydroxy functionality of 1-8 and an average molecular weight of 32-8000 and mixtures of said monools and/or polyols.

According to embodiments, the one or more isocyanate reactive compounds used in the process for making a PIR-PUR foam according to the invention is selected from monools selected from methanol, ethanol, propanol, butanol, phenol, cyclohexanol and hydrocarbon monools having an average molecular weight of 200-5000 like aliphatic and polyether monools and/or polyols selected from ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having a molecular weight of up to 8000, preferably 200-6000 polyester polyols having an average molecular weight of 200-8000, preferably 200-6000, polyether polyester polyols having an average molecular weight of 200-8000, preferably 200-6000 and polyether polyols having an average molecular weight of 200-8000, preferably 200-6000.

According to embodiments, the blowing agent(s) used in the process for making a PIR-PUR foam according to the invention is (are) selected from isobutene, dimethyl ether, water, methylene chloride, acetone, chlorofluorocarbons (CFCs), hydrofluorocarbons (HFCs), hydrochlorofluorocarbons.

According to embodiments, the blowing agent(s) used in the process for making a PIR-PUR foam according to the invention is (are) present in an amount of 1 to 80 pbw parts by weight (pbw), preferably from 5 to 60 pbw calculated per hundred weight parts of the one or more isocyanate reactive compounds (including the weight contribution of the catalyst system diluent).

The present invention further relates to an isocyanate-reactive composition comprising:
a) one or more isocyanate reactive compounds;
b) a trimerization catalyst composition comprising at least one trimerization catalyst compound selected from one or more organic alkoxides corresponding to the formula (I):

(R—O—)$_x$M$^{+x}$       (I)

Wherein
R is an organic group which is selected from an hydrocarbyl group wherein the hydrocarbyl groups having 1-4 carbon atoms,
x is a number being defined by the oxidation state of M
M is selected from an alkali metal ion, an earth alkali metal ion, a transition metal ion such as Ti or a quaternary ammonium ion
c) optionally one or more surfactants, one or more flame retardants, water, one or more antioxidants, one or more auxiliary blowing agents, one or more urethane catalysts, one or more auxiliary trimerisation catalysts, or combinations thereof The present invention further relates to a polyisocyanurate comprising material obtainable by the process according to the invention. Said polyisocyanurate comprising material may be a polyisocyanurate-polyurethane comprising foam (PIR-PUR).

According to embodiments, the polyisocyanurate comprising material according to the invention has a free rise density (measured according to ISO 845) in the range of between 25 kg/m$^3$ up to 60 kg/m$^3$, preferably in the range 30 kg/m$^3$ up to 55 kg/m$^3$, a thermal conductivity in the range 20 up to 30 mW/mK, preferably 20 up to 25 mW/mK and having a closed cell content higher than 75% calculated on the total amount of closed and open cells being present in the material.

According to embodiments, the polyisocyanurate comprising material according to the invention may be used for thermal insulation and/or in insulation panels.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention.

DEFINITIONS AND TERMS

In the context of the present invention the following terms have the following meaning:
1) isocyanate index or NCO index or index:
the ratio of NCO-groups over isocyanate-reactive hydrogen atoms present in a formulation, given as a percentage:

$$\frac{[NCO] \times 100}{[\text{active hydrogen}]}(\%).$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water, if used) present at the actual polymerisation stage are taken into account.

2) The expression "isocyanate-reactive compounds" and "isocyanate-reactive hydrogen atoms" as used herein for the purpose of calculating the isocyanate index refers to the total of active hydrogen atoms in hydroxyl and amine groups present in the isocyanate reactive compounds; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.
3) Reaction system: a combination of compounds wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to number average unless indicated otherwise.
6) "Trimerization catalyst" as used herein refers to a catalyst being able to catalyse (promote) the formation of isocyanurate groups from polyisocyanates. This means that isocyanates can react with one another to form macromolecules with isocyanurate structures (polyisocyanurate=PIR). Reactions between isocyanates-polyols and isocyanates-isocyanates (homopolymerization) can take place simultaneously or in direct succession, forming macromolecules with urethane and isocyanurate structures (PIR-PUR).
7) "Polyisocyanurate comprising material" (foam) refers to a material composition comprising urethane and isocyanurate structures (PIR-PUR) made at an isocyanate index 180 or higher, more preferably at an isocyanate index higher than 250.
8) "Free rise density" refers to density measured on foam samples made under atmospheric conditions (in the presence of blowing agents) according to ISO 845.
9) Thermal conductivity measurements are carried out at 10° C. according to ISO8301 using a Heat Flow Meter (HFM) apparatus.
10) Open cell content of a foam is measured using a pycnometer according to ISO 4590

DETAILED DESCRIPTION

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

It is to be understood that although preferred embodiments and/or materials have been discussed for providing embodiments according to the present invention, various modifications or changes may be made without departing from the scope and spirit of this invention.

The present invention relates to a trimerization catalyst composition and a process for making a polyisocyanurate comprising foam, more particularly for making a rigid polyisocyanurate comprising rigid foam.

According to embodiments, the trimerization catalyst composition comprises at least a catalyst compound selected from one or more organic alkoxides, preferably said organic salt is selected from alkali metal, earth alkali metal, transition metal such as Ti and/or quaternary ammonium organic alkoxides.

According to embodiments, the trimerization catalyst compound comprises a salt which is a reaction product of an alkali metal, an earth alkali metal, a transition metal such as Ti and/or ammonium, preferably as a metal hydroxide with a suitable alkanol.

According to an embodiment, the trimerization catalyst compound according to the invention comprises an alkoxy group having the structure R—O⁻ which consists of an organic group R bonded to a negatively charged oxygen atom and a metal or ammonium ion bonded to said alkoxy group. Hence the catalyst compound according the invention corresponds to the general formula (I):

$$(R-O^-)_x M^{+x} \qquad (I)$$

Wherein R is an organic group which may be selected from a hydrocarbyl group which hydrocarbyl groups less than 5 carbon atoms, preferably 1-4 carbon atoms, x is a number being defined by the oxidation state of M and wherein M is selected from a metal ion or quaternary ammonium ion. M may be selected from an alkali metal ion, an earth alkali metal ion, a transition metal ion such as Ti and/or a quaternary ammonium ion.

According to embodiments, the trimerization catalyst compound may be selected from potassium ethoxide, sodium ethoxide, potassium methoxide, sodium methoxide, potassium tert-butoxide, titanium isopropoxide and mixtures thereof suitable for making a polyisocyanurate comprising rigid foam.

According to embodiments, the trimerization catalyst composition according to the invention may further comprise a solvent.

According to embodiments the trimerization catalyst composition according to the invention may further comprise a monool/polyol composition.

Preferably said polyol/monool composition is suitable for use as isocyanate reactive agent and preferably comprises polyester and/or polyether polyols having an average molecular weight of preferably 32-6000 and an average nominal functionality of preferably 1-8.

According to embodiments, the trimerization catalyst composition according to the invention may further comprise optionally one or more surfactants, one or more flame retardants, water, one or more antioxidants, one or more auxiliary blowing agents, one or more urethane catalysts, one or more auxiliary trimerisation catalysts (other than the trimerisation catalyst compound according to the invention), or combinations thereof.

Using the trimerization catalyst compound according to the invention as trimerization catalyst compound gives rise to a less pronounced second rise during curing. Said second rise typically takes place at a later stage in the process for making a PIR-PUR foam when the temperature is high. The ring formation (PIR formation) itself is exothermic causing the foam to rise again which gives rise to the "second rise" phenomenon. Using the catalyst of the present invention leads to a less pronounced second rise profile and hence a smoother rise profile in general (meaning that the transition from the first to the second rise occurs smoothly without abrupt increase in rise profile).

An advantage of the catalyst of the present invention is that it can be used as a catalyst to initiate polyurethane (PUR) formation and at the same time can be used as a catalyst to initiate polyisocyanurate (PIR) formation. This combined catalytic effect leads to a less pronounced second rise during curing.

The process for making a polyisocyanurate comprising foam according to the invention may comprise combining and mixing at least following compounds at an isocyanate index of at least more than 100, preferably an isocyanate index of 180 or higher, more preferably at an isocyanate index higher than 250:

a polyisocyanate composition comprising one or more polyisocyanate compounds;
a trimerization catalyst composition comprising at least a trimerization catalyst compound,
an isocyanate-reactive composition comprising one or more isocyanate reactive compounds;
optionally providing one or more surfactants, one or more flame retardants, water, one or more antioxidants, one or more auxiliary blowing agents, one or more urethane catalysts, one or more auxiliary trimerisation catalysts, or combinations thereof;

wherein the trimerization catalyst compound is selected from compounds which comprise an alkoxy group and correspond to the formula (I)

(R—O$^-$)$_x$M$^{+x}$ (I)

Wherein
R is an organic group which is selected from an hydrocarbyl group which hydrocarbyl groups having less than 5 carbon atoms, preferably 1-4 carbon atoms,
x is a number being defined by the oxidation state of M
M is selected from an alkali metal ion, an earth alkali metal ion, a transition metal ion such as Ti and/or a quaternary ammonium ion According to embodiments, the trimerisation catalyst compound should be present in the foam formulation in a catalytically effective amount, preferably the trimerisation catalyst compound is present in amounts the trimerisation catalyst compound is present in an amount such that the number of catalyst equivalents over the number of isocyanate equivalents ranges from 0.001 to 0.4, preferably in an amount from 0.01 to 0.26, or from 0.01 to 024, or from 0.02 to 0.2.

There are many different orders of contacting or combining the compounds required to make the polyisocyanurate comprising foam of the present invention. One of skill in the art would realize that varying the order of addition of the compounds falls within the scope of the present invention.

According to embodiments, the polyisocyanate compounds used in the process for making a PIR-PUR foam according to the invention are selected from organic isocyanates containing a plurality of isocyanate groups including aliphatic isocyanates such as hexamethylene diisocyanate and more preferably aromatic isocyanates such as m- and p-phenylene diisocyanate, tolylene-2,4- and 2,6-diisocyanates, diphenylmethane-4,4'-diisocyanate, chlorophenylene-2,4-diisocyanate, naphthylene-1,5-diisocyanate, diphenylene-4,4'-diisocyanate, 4,4'-diisocyanate-3,3'-dimethyldiphenyl, 3-methyldiphenylmethane-4,4'-diisocyanate and diphenyl ether diisocyanate, cycloaliphatic diisocyanates such as cyclohexane-2,4- and 2,3-diisocyanates, 1-methyl cyclohexyl-2,4- and 2,6-diisocyanates and mixtures thereof and bis-(isocyanatocyclohexyl-)methane and triisocyanates such as 2,4,6-triisocyanatotoluene and 2,4,4'-triisocyanatodiphenyl ether. According to embodiments, the polyisocyanate composition comprises mixtures of polyisocyanates. For example a mixture of tolylene diisocyanate isomers such as the commercially available mixtures of 2,4- and 2,6-isomers and also the mixture of di- and higher poly-isocyanates produced by phosgenation of aniline/formaldehyde condensates. Such mixtures are well-known in the art and include the crude phosgenation products containing mixtures of methylene bridged polyphenyl polyisocyanates, including diisocyanate, triisocyanate and higher polyisocyanates together with any phosgenation by-products.

Preferred polyisocyanate compositions of the present invention are those wherein the polyisocyanate is an aromatic diisocyanate or polyisocyanate of higher functionality in particular crude mixtures of methylene bridged polyphenyl polyisocyanates containing diisocyanates, triisocyanate and higher functionality polyisocyanates. Methylene bridged polyphenyl polyisocyanates (e.g. Methylene diphenyl diisocyanate, abbreviated as MDI) are well known in the art and have the generic formula I wherein n is one or more and in the case of the crude mixtures represents an average of more than one. They are prepared by phosgenation of corresponding mixtures of polyamines obtained by condensation of aniline and formaldehyde.

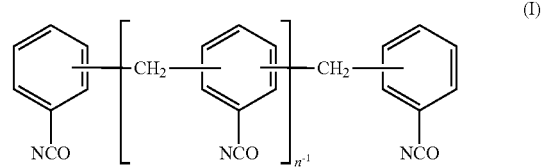

(I)

Other suitable polyisocyanate compositions may include isocyanate ended prepolymers made by reaction of an excess of a diisocyanate or higher functionality polyisocyanate with a hydroxyl ended polyester or hydroxyl ended polyether and products obtained by reacting an excess of diisocyanate or higher functionality polyisocyanate with a monomeric polyol or mixture of monomeric polyols such as ethylene glycol, trimethylol propane or butane-diol. One preferred class of isocyanate-ended prepolymers are the isocyanate ended prepolymers of the crude mixtures of methylene bridged polyphenyl polyisocyanates containing diisocyanates, triisocyanates and higher functionality polyisocyanates.

According to embodiments, the polyisocyanate compounds in the polyisocyanate composition are selected from a toluene diisocyanate, a methylene diphenyl diisocyanate or a polyisocyanate composition comprising a methylene diphenyl diisocyanate or a mixture of such polyisocyanates.

According to embodiments, the one or more isocyanate reactive compounds are selected from monools and/or polyols such as glycols, high molecular weight polyether polyols and polyester polyols, mercaptans, carboxylic acids such as polybasic acids, amines, polyamines, components comprising at least one alcohol group and at least one amine group such as polyaminepolyols, urea and amides.

According to embodiments the isocyanate reactive component is selected from monools or polyols which have an average nominal hydroxy functionality of 1-8 and an average molecular weight of 32-8000 and mixtures of said monools and/or polyols.

According to embodiments the isocyanate reactive component is selected from monools selected from methanol, ethanol, propanol, butanol, phenol, cyclohexanol and hydrocarbon monools having an average molecular weight of 200-5000 like aliphatic and polyether monools and/or polyols selected from ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, aromatic and/or aliphatic polyols having a molecular weight of up to 8000, preferably 200-6000 polyester polyols having an average molecular weight of 200-8000, preferably 200-6000, polyether polyester polyols having an average molecular weight of 200-8000, preferably 200-6000 and polyether polyols having an average molecular weight of 200-8000, preferably 200-6000. An example of a suitable polyol is Daltolac® R251 (commercial available polyol from Huntsman)

According to embodiments, the isocyanate index ranges from at least more than 100, preferably an isocyanate index of 180 or higher, more preferably at an isocyanate index higher than 250. For example the isocyanate index may range from 150 to 650, from 150 to 600, or from 180 to 500.

According to embodiments, the blowing agent may be selected from isobutene, dimethyl ether, water, methylene chloride, acetone, chlorofluorocarbons (CFCs), hydrofluorocarbons (HFCs), hydrochlorofluorocarbons (HCFCs), and hydrocarbons such as pentane. The amount of blowing agent used can vary based on, for example, the intended use and application of the foam product and the desired foam stiffness and density. The blowing agent may be present in amounts from 1 to 80 parts by weight (pbw) per hundred weight parts isocyanate reactive compounds (polyol) including the weight contribution of the catalyst diluent, more preferably from 5 to 60 pbw. If water is used as blowing agent in the formulation, it should be kept separately from the catalyst compound until the step of contacting and mixing the ingredients and the amount of water is preferably limited to amounts up to 15 pbw. In other words, water can range from 0 to 15 pbw.

According to embodiments, one or more urethane catalyst compounds are added to accelerate the reaction to form polyurethanes, in the process of making the polyisocyanurate comprising foam of the present invention. Urethane catalysts suitable for use herein include, but are not limited to, metal salt catalysts, such as organotins, and amine compounds, such as triethylenediamine (TEDA), N-methylimidazole, 1,2-dimethylimidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyldiethylenetriamine, hexamethyltriethylenetetramine, heptamethyltetraethylenepentamine, dimethylaminocyclohexylamine, pentamethyldipropylene-triamine, triethanolamine, dimethylethanolamine, bis(dimethylaminoethyl)ether, tris(3-dimethylamino)propylamine, or its acid blocked derivatives, and the like, as well as any mixture thereof.

According to embodiments, one or more urethane catalyst compounds may be added if needed although the catalyst according to the invention is suitable for both polyurethane formation and polyisocyanurate formation. Said urethane catalyst compound may be added to the formulation in an amount such that the number of urethane catalyst equivalents over the number of isocyanate equivalents ranges from 0 to 0.2, preferably in an amount from 0 to 0.04, or from 0 to 0.026, or from 0 to 0.01

The present invention further relates to a polyisocyanurate comprising foam made using the process according to the invention and making use of the trimerization catalyst disclosed in the present invention (see formula I) and the use of said foam as (thermal) insulating (rigid) foam.

According to embodiments, the polyisocyanurate comprising material according to the invention has a free rise density in the range between 25 kg/m$^3$ up to 60 kg/m$^3$, preferably in the range 30 kg/m$^3$ up to 55 kg/m$^3$ (however it may have a free rise density up to 100 kg/m$^3$ and higher for some applications), a thermal conductivity in the range 20 up to 30 mW/mK, preferably 20 up to 25 mW/mK and having a closed cell content higher than 75% calculated on the total amount of closed and open cells being present in the material.

According to embodiments, the polyisocyanurate comprising material according to the invention has a compression hardness at 10% strain between 80 and 300 kPa, measured in three dimensions (thickness, length and width according to ISO844).

According to embodiments, the polyisocyanurate comprising foam of the instant invention may be used as thermal insulation such as construction thermal insulation foams or appliance thermal insulation foams in e.g. insulation panels. The polyisocyanurate comprising foam of the instant invention fulfills all the requirements for use of insulation materials in the building industry especially due to their low thermal conductivity values and excellent mechanical strength values.

According to embodiments, the polyisocyanurate comprising foam of the instant invention may be used as thermal insulation and may be produced by means of spraying after the required ingredients were mixed at the departure point from a spray nozzle to form a thermal insulation foam on a wall.

FIGURES

Figure 3:
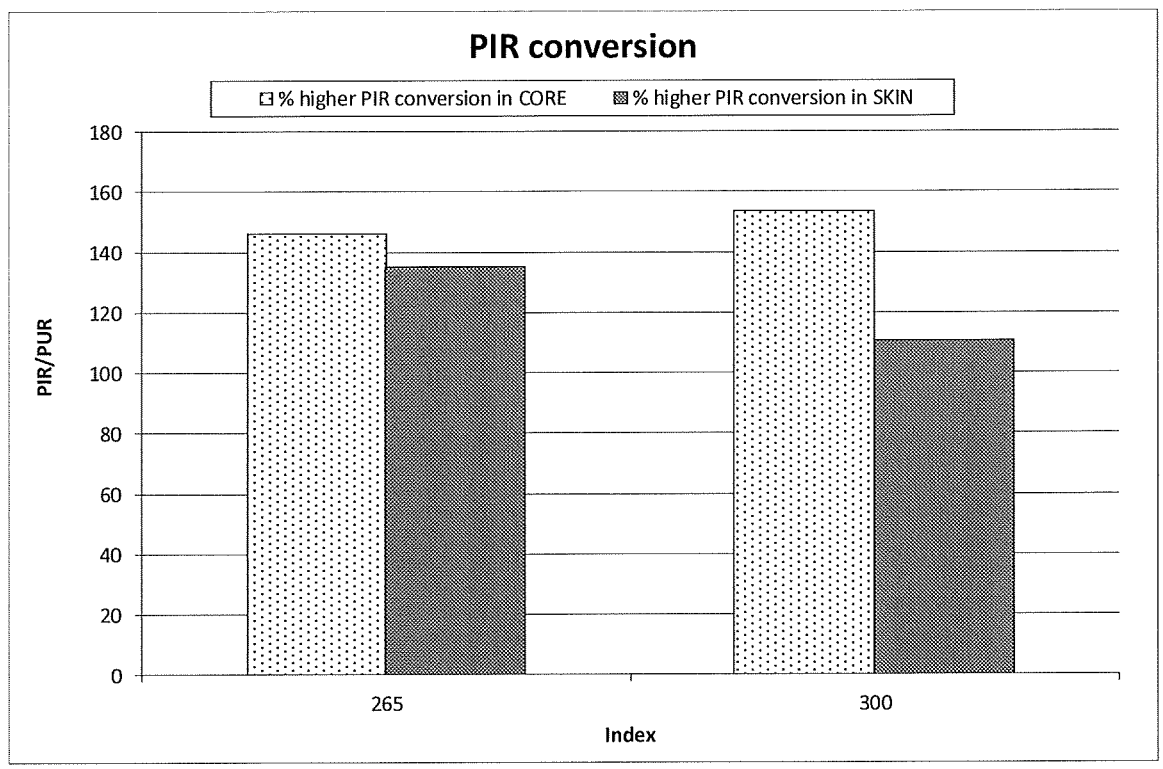

FIG. 3 illustrates the increase in PIR conversion in the core and the skin for a polyisocyanurate comprising insulation foam fabricated using an isocyanate index of respectively 265 (example 1) and 300 (example 2) according the according to the present invention compared to a polyisocyanurate comprising insulation foam not according to the invention fabricated using an isocyanate index of 265 and 300 (wherein the comparative foam is taken as 100%).

EXAMPLES

Chemicals Used:

Suprasec® 2085 polyisocyanate ex Huntsman, in the examples indicated as S2085

Flame retardant Tris chloroisopropyl phosphate (TCPP)

Tegostab® B8484 ex Evonik, polyether modified polysiloxane-copolymer

Catalyst Dabco® K15 ex Air Products, Potassium octoate in Diethylene glycol

Catalyst Cat LB ex Huntsman Potassium Acetate/Ethyleneglycol/water

Sodium Ethoxide ex Sigma Aldrich, 21% pure in ethanol

Daltolac® R251 ex Huntsman PO polyol, glycerol initiated OHv=250 mg KOH/g

Water

N-Pentane ex Emplura

Catalyst PMDETA ex Huntsman, Pentaethyldiethylenetriamine

Suprasec®, Daltolac® and Daltocel® are trademarks of the Huntsman Corporation or an Affiliate thereof and have been registered in one or more but not all countries.

Example 1: Fabrication of a Polyisocyanurate Comprising Insulation Foam Using Isocyanate Index 265

Two polyisocyanurate comprising insulation foams were fabricated using an isocyanate index of 265. The foam according the according to the present invention was prepared using Na-ethoxide as a trimerization catalyst (example 1). For the comparative foam 1, Cat LB and Dabco® K15 was used as a trimerisation catalyst.

Table 1 summarizes the amounts of ingredients used in pbw (part by weight) to fabricate example 1 according to the present invention using Na-ethoxide as a trimerization catalyst and to fabricate comparative foam 2 using Cat LB and Dabco® K15 as a trimerisation catalyst, both at an isocyanate index of 265.

TABLE 1

|  | Comparative 1 pbw | Invention (example 1) pbw |
|---|---|---|
| S2085 | 190 | 198 |
| Daltolac ® R251 | 100 | 100 |
| TCCP | 15 | 15.4 |
| Tegostab ® B 8484 | 2 | 2.06 |
| PMDETA | 0.25 | 0.27 |
| Cat LB | 0.40 | — |
| Dabco ® K15 | 2.20 | — |
| Sodium ethoxide (21%) | — | 2.03 |
| Water | 0.50 | 0.51 |
| n-pentane | 19 | 19.6 |
| ISO index | 265 | 265 |
| Free Rise Density (kg/m³) | 58 | 56 |
| End of rise (s) | 127 | 132 |
| Cream Time (s) | 14 | 13 |

Figure 1:
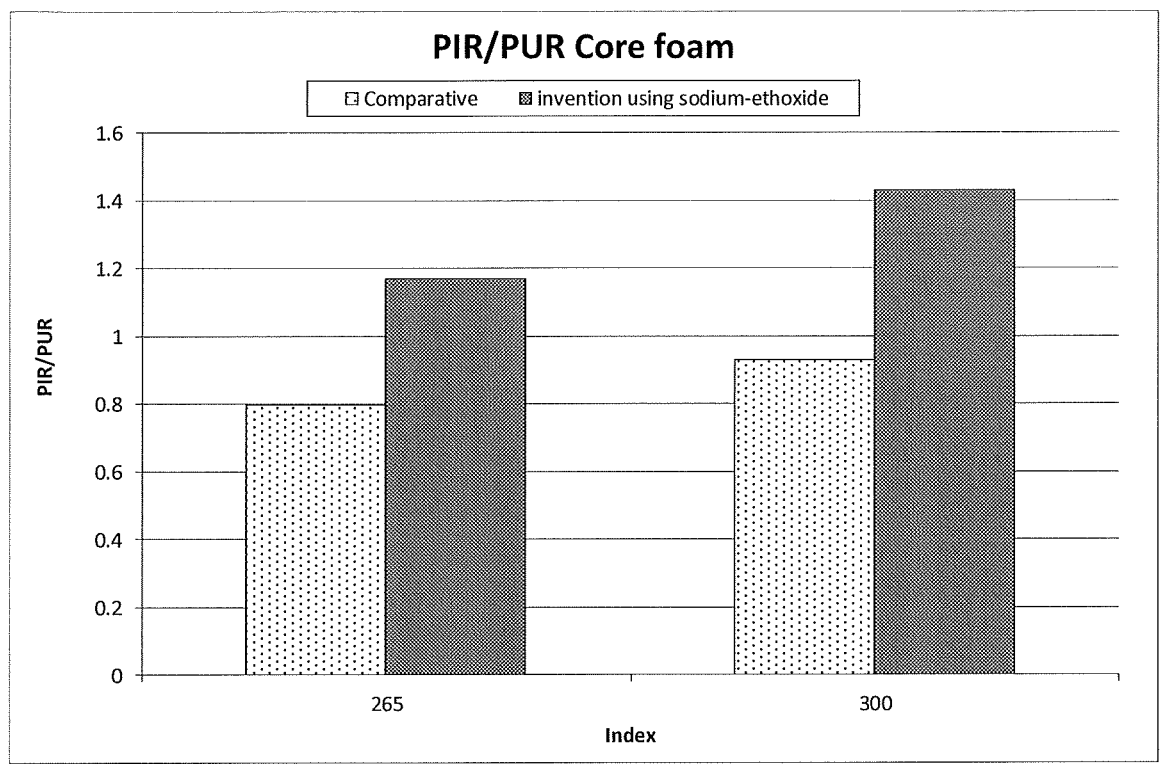
FIG. 1 illustrates the PIR/PUR ratio in the core for a polyisocyanurate comprising insulation foam fabricated according to the present invention and for a polyisocyanurate comprising insulation foam not fabricated according to the invention (comparative) using an isocyanate index of 265 and 300.

FIG. 1 illustrates the PIR/PUR ratio in the core for example 1 and for the comparative example fabricated using an isocyanate index of 265. The increase in PIR conversion for example 1 compared to the comparative example 1 is significant.

Figure 2:
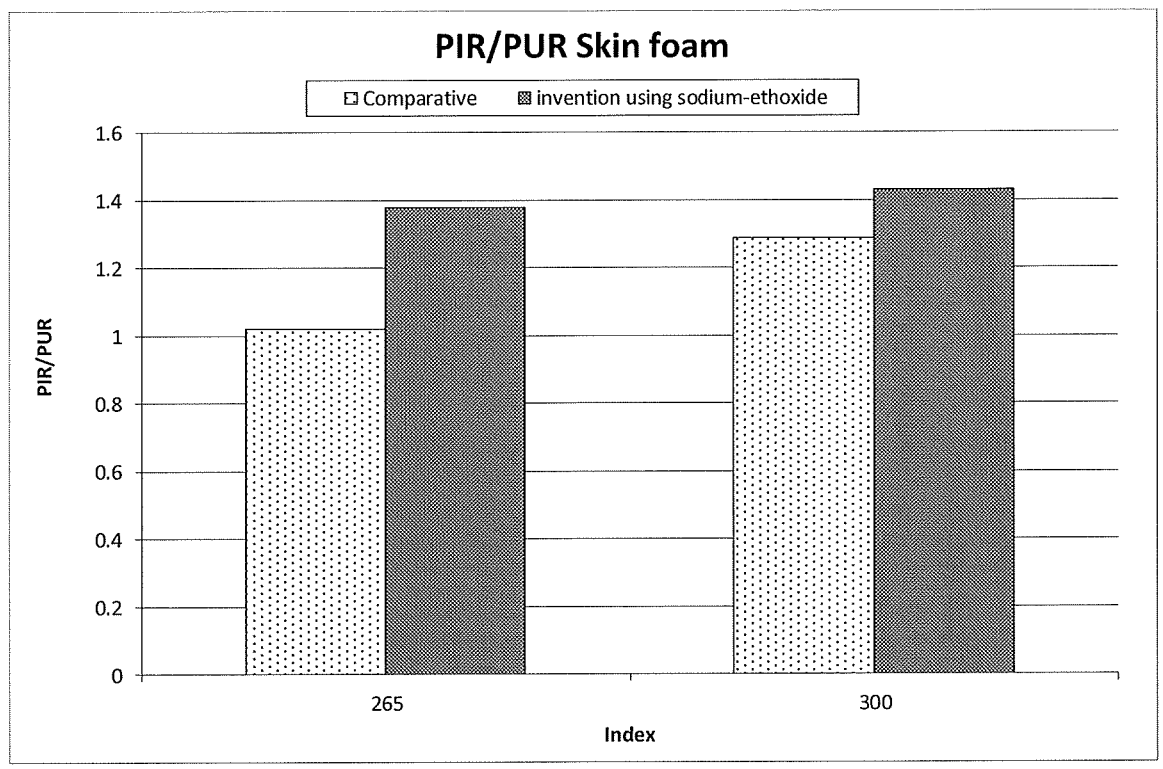
FIG. 2 illustrates the PIR/PUR ratio in the skin for a polyisocyanurate comprising insulation foam fabricated according to the present invention and for a polyisocyanurate comprising insulation foam not fabricated according to the invention (comparative) using an isocyanate index of 265 and 300.

FIG. 2 illustrates the PIR/PUR ratio in the skin of the foam for example 1 and for the comparative example fabricated using an isocyanate index of 265. The increase in PIR conversion for example 1 in the skin compared to the comparative example 1 is significant and surprising.

FIG. 3 illustrates the increase in PIR conversion in the core and the skin for a polyisocyanurate comprising insulation foam fabricated using an isocyanate index of respectively 265 (example 1a) according the according to the present invention compared to a polyisocyanurate comprising insulation foam not according to the invention fabricated using an isocyanate index of 265 and 300 (wherein the comparative foam is taken as 100%).

Example 2 Fabrication of a Polyisocyanurate Comprising Insulation Foam Using Isocyanate Index 300

Two polyisocyanurate comprising insulation foams were fabricated using an isocyanate index of 300. The foam according the according to the present invention was prepared using Na-ethoxide as a trimerization catalyst (example 2). For the comparative foam 2, Cat LB and Dabco® K15 was used as a trimerisation catalyst.

Table 2 summarizes the amounts of ingredients used in pbw (part by weight) to fabricate the example 2 according to the present invention using Na-ethoxide as a trimerization catalyst and to fabricate the comparative foam 2 using Cat LB and Dabco® K15 as a trimerisation catalyst, both at an isocyanate index of 300.

TABLE 2

|  | Comparative 2 pbw | Invention (example 2) pbw |
|---|---|---|
| S2085 | 218 | 228 |
| Daltolac ® R251 | 100 | 100 |
| TCCP | 16.4 | 16.9 |
| Tegostab ® B 8484 | 2.2 | 2.3 |
| PMDETA | 0.3 | 0.3 |
| Cat LB | 0.4 | — |
| Dabco ® K15 | 2.4 | — |
| Sodium ethoxide (21%) | — | 2.2 |
| Water | 0.5 | 0.6 |
| n-pentane | 21 | 21.6 |
| ISO index | 300 | 300 |
| Free Rise Density (kg/m³) | 56 | 61 |
| End of rise (s) | 133 | 115 |
| Cream Time (s) | 17 | 12 |

FIG. 1 illustrates the PIR/PUR ratio in the core for example 2 and for the comparative example fabricated using an isocyanate index of 300. The increase in PIR conversion for example 2 compared to the comparative example 2 is significant.

FIG. 2 illustrates the PIR/PUR ratio in the skin of the foam for example 1 and for the comparative example fabricated using an isocyanate index of 300. The increase in PIR conversion for example 2 in the skin compared to the comparative example 2 is still significant and surprising.

FIG. 3 illustrates the increase in PIR conversion in the core and the skin for a polyisocyanurate comprising insulation foam fabricated using an isocyanate index of respectively 300 (example 1) according the according to the present invention compared to a polyisocyanurate comprising insulation foam not according to the invention fabricated using an isocyanate index of 300 (wherein the comparative foam is taken as 100%).

The invention claimed is:

1. A process for making polyisocyanurate-polyurethane rigid foam (PIR-PUR), having a free rise density between 25 kg/m³ up to 100 kg/m³, a compression hardness at 10% strain between 80 and 300 kPa (measured in three dimensions according to ISO844), and a thermal conductivity in the range of 20 mW/mK up to 30 mW/mK, said process comprising combining and mixing at an isocyanate index of at least 180 or higher:
- a) a polyisocyanate composition comprising one or more polyisocyanate compounds;
- b) an isocyanate reactive compound selected from a monool, a polyol and a mixture thereof;
- c) a trimerization catalyst selected from potassium ethoxide, sodium ethoxide, potassium methoxide, sodium methoxide, potassium tert-butoxide, titanium isopropoxide, and a mixture thereof;
- d) optionally one or more surfactants, one or more flame retardants, water, one or more antioxidants, one or more auxiliary blowing agents, one or more urethane catalysts, one or more auxiliary trimerisation catalysts, or combinations thereof; and wherein the rigid foam exhibits a smooth rise profile during curing, wherein the trimerization catalyst is present in an amount such that the number of trimerization catalyst equivalents over the number of isocyanate equivalents ranges in an amount from 0.001 to 0.4, and wherein, when present, the one or more auxiliary blowing agents is not a hydrofluorocarbon or a hydrochlorofluorocarbon compound.

2. The process according to claim 1, wherein the trimerization catalyst is present in a solvent.

3. The process according to claim 1, wherein the trimerization catalyst and the isocyanate reactive compound are present in the solvent.

4. The process according to claim 1, wherein polyol is selected from a polyester polyol, a polyether polyol, and a combination thereof wherein the polyester polyol and polyether polyol have an average molecular weight of 32-6000 and an average nominal functionality of 1-8.

5. The process according to claim 1, wherein the number of trimerization catalyst equivalents over the number of isocyanate equivalents ranges from 0.01 to 0.24.

6. The process according to claim 1, wherein the polyisocyanate compounds are selected from a toluene diisocyanate, a methylene diphenyl diisocyanate and a mixture thereof.

7. The process according to claim 1, wherein the monools and polyols have an average nominal hydroxy functionality of 1-8 and an average molecular weight of 32-8000.

8. The process according to claim 1, wherein the monool is selected from methanol, ethanol, propanol, butanol, phenol, cyclohexanol, and a hydrocarbon monool having an average molecular weight of 200-5000, and the polyol is selected from ethylene glycol, diethylene glycol, triethylene glycol, propylene glycol, dipropylene glycol, tripropylene glycol, trimethylol propane, sorbitol, sucrose, glycerol, ethanediol, propanediol, butanediol, pentanediol, hexanediol, an aromatic polyol having a molecular weight of up to 8000, an aliphatic polyol having a molecular weight of up to 8000, a polyester polyol having an average molecular weight of 200-8000, a polyether polyester polyol having an average molecular weight of 200-8000, and a polyether polyol having an average molecular weight of 200-8000.

9. The process according to claim 1, wherein the auxiliary blowing agent is selected from isobutene, dimethyl ether, water, methylene chloride, acetone, chlorofluorocarbons (CFCs), hydrocarbons and a mixture thereof and wherein the auxiliary blowing agent is present in an amount of 1 to 80 parts by weight (pbw), calculated per hundred weight parts of the one or more isocyanate reactive compounds (including the weight contribution of a catalyst system diluent).

10. A polyisocyanurate-polyurethane comprising rigid foam material obtainable by the process according to claim 1.

11. The polyisocyanurate-polyurethane comprising rigid foam material according to claim 10, having a free rise density (measured according to ISO 845) in the range of between 25 kg/m³ up to 60 kg/m³, a thermal conductivity in the range 20 up to 30 mW/mK, and having a closed cell content higher than 75% calculated on the total amount of closed and open cells being present in the rigid foam material.

* * * * *